United States Patent
Park et al.

(10) Patent No.: US 11,122,621 B2
(45) Date of Patent: Sep. 14, 2021

(54) METHOD FOR TRANSMITTING AND RECEIVING DATA OVER SECONDARY CHANNEL IN WIRELESS LAN SYSTEM AND APPARATUS THEREFOR

(71) Applicant: LG ELECTRONICS INC., Seoul (KR)

(72) Inventors: Sungjin Park, Seoul (KR); Jinmin Kim, Seoul (KR); Sunwoong Yun, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/629,025

(22) PCT Filed: Jul. 6, 2018

(86) PCT No.: PCT/KR2018/007674
§ 371 (c)(1),
(2) Date: Jan. 6, 2020

(87) PCT Pub. No.: WO2019/009652
PCT Pub. Date: Jan. 10, 2019

(65) Prior Publication Data
US 2020/0205194 A1 Jun. 25, 2020

Related U.S. Application Data

(60) Provisional application No. 62/528,992, filed on Jul. 6, 2017.

(51) Int. Cl.
*H04W 74/08* (2009.01)
*H04W 40/24* (2009.01)
(Continued)

(52) U.S. Cl.
CPC ...... *H04W 74/0808* (2013.01); *H04W 40/244* (2013.01); *H04W 72/0426* (2013.01); *H04W 84/12* (2013.01)

(58) Field of Classification Search
CPC .......... H04W 74/0808; H04W 40/244; H04W 72/0426; H04W 84/12
(Continued)

(56) References Cited

U.S. PATENT DOCUMENTS

2013/0003679 A1\* 1/2013 Seok .................. H04W 16/14
370/329
2014/0376519 A1\* 12/2014 Yang .................. H04L 61/6022
370/336
(Continued)

FOREIGN PATENT DOCUMENTS

KR 1020170015378 2/2017
WO 2015034166 3/2015
(Continued)

OTHER PUBLICATIONS

PCT International Application No. PCT/KR2018/007674, Written Opinion of the International Searching Authority dated Oct. 1, 2018, 19 pages.

*Primary Examiner* — Danh C Le
(74) *Attorney, Agent, or Firm* — Lee, Hong, Degerman, Kang & Waimey

(57) ABSTRACT

The present specification presents a method for transmitting and receiving data of a station over a secondary channel in a wireless LAN (WLAN) system and an apparatus therefor. Particularly, the present invention may comprise the steps of: receiving, from an access point (AP), allocation information on the secondary channel of the wireless LAN system and information on the secondary channel; performing a channel sensing (CS) mechanism by using an interframe space (IFS) determined on the basis of the information
(Continued)

on the secondary channel during an allocation interval in the secondary channel, wherein the allocation interval is indicated by the allocation information; and transmitting, to a second STA, data during the allocation interval from the point in time at which it is determined, according to the performed CS mechanism, that the secondary channel is in an idle state.

12 Claims, 14 Drawing Sheets

(51) Int. Cl.
*H04W 72/04* (2009.01)
*H04W 84/12* (2009.01)

(58) Field of Classification Search
USPC .................... 370/329, 338, 310.2; 455/450.1
See application file for complete search history.

(56) References Cited

U.S. PATENT DOCUMENTS

| | | | |
|---|---|---|---|
| 2016/0254930 A1* | 9/2016 | Hui | H04L 5/0048 370/329 |
| 2016/0270120 A1* | 9/2016 | Kronander | H04W 74/08 |
| 2016/0316458 A1* | 10/2016 | Kwon | H04L 5/0053 |
| 2016/0360528 A1* | 12/2016 | Kim | H04W 72/0446 |
| 2017/0006634 A1* | 1/2017 | Luo | H04W 74/085 |
| 2017/0208625 A1* | 7/2017 | Choi | H04W 74/006 |
| 2018/0167969 A1* | 6/2018 | Yeo | H04W 74/02 |
| 2019/0372706 A1* | 12/2019 | Li | H04W 88/08 |
| 2020/0146060 A1* | 5/2020 | Jung | H04W 4/40 |

FOREIGN PATENT DOCUMENTS

| | | |
|---|---|---|
| WO | 2015084095 | 6/2015 |
| WO | 2016088956 | 6/2016 |
| WO | 2016182264 | 11/2016 |

* cited by examiner

FIG. 18

| Element ID | Length | Element ID Extension | Number of Allocations | Channel Allocation 1 | ... | Channel Allocation N |
|---|---|---|---|---|---|---|
| 1 | 1 | 1 | 1 | 6 or 18 | | 6 or 18 |

Octets:

(a) EDMG Extended Schedule element format

| B0 | B1 B24 | B25 | B26 B33 | B34 | B35 B43 | B44 B45 | B46 B47 |
|---|---|---|---|---|---|---|---|
| Scheduling Type | Allocation Key | Channel Aggregation | BW | Asymmetric Beamforming Training | Receive Direction | Nmax STS | Reserved |
| 1 | 24 | 1 | 8 | 1 | 9 | 2 | 2 |

Bits:

(b) Channel Allocation field format when Scheduling Type is 0

| B0 | B1 | B2 B9 | B10 | B11 B19 | B20 B21 | B22 B23 | B24 B143 |
|---|---|---|---|---|---|---|---|
| Scheduling Type | Channel Aggregation | BW | Asymmetric Beamforming Training | Receive Direction | Nmax STS | Reserved | Allocation |
| 1 | 1 | 8 | 1 | 9 | 2 | 2 | 8 × 15 |

Bits:

(c) Channel Allocation field format when Scheduling Type is 1

METHOD FOR TRANSMITTING AND RECEIVING DATA OVER SECONDARY CHANNEL IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2018/007674, filed on Jul. 6, 2018, which claims the benefit of U.S. Provisional Application No. 62/528,992, filed on Jul. 6, 2017, the contents of which are all hereby incorporated by reference herein in their entirety.

TECHNICAL FIELD

The present disclosure relates to a wireless communication system, and more particularly, to a method by which a station transmits and receives data over a secondary channel in a wireless local area network (WLAN) system and apparatus therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Meanwhile, IEEE 802.11ad defines performance enhancement for high-speed throughput in the 60 GHz band, and IEEE 802.11ay, for introducing channel bonding and MIMO technology to IEEE 802.11ad systems for the first time, is being discussed.

DISCLOSURE

Technical Problem

The object of the present disclosure is to provide a method by which a station transmits and receives data over a secondary channel other than a primary channel of a system and apparatus therefor

Technical Solution

In an aspect of the present disclosure, provided herein is a method of transmitting, by a first station (STA), data to a second STA in a wireless local area network (WLAN) system. The method may include: receiving allocation information on a secondary channel of the WLAN system and information on the secondary channel from an access point (AP); performing a channel sensing (CS) mechanism using an interframe space (IFS) determined based on the information on the second channel within an allocation period on the secondary channel, wherein the allocation period is indicated by the allocation information; and transmitting the data to the second STA during the allocation period from a time when it is determined by the performed CS mechanism that the secondary channel is an idle state.

In this case, the allocation information on the secondary channel and the information on the secondary channel may be received on a primary channel of the WLAN system.

In particular, the allocation information on the secondary channel and the information on the secondary channel may be transmitted within a beacon header interval (BHI) or a data transmission interval (DTI) on the primary channel.

Transmitting the data by the first STA to the second STA may include transmitting the data by the first STA to the second STA after a lapse of a predetermined length of a backoff time from the time when it is determined by the performed CS mechanism that the secondary channel is in the idle state. In this case, the predetermined length of the backoff time may be determined based on the information on the secondary channel.

The information on the secondary channel may include information on whether the secondary channel is busy during the allocation period indicated by the allocation information.

Thus, the IFS used in the CS mechanism and the predetermined length of the backoff time may be configured differently depending on the information on whether the secondary channel is busy.

When the information on the secondary channel indicates that the secondary channel is busy during the allocation period indicated by the allocation information, the IFS used in the CS mechanism may be set to an arbitration IFS (AIFS) per category for the data.

When the information on the secondary channel indicates that the secondary channel is not busy during the allocation period indicated by the allocation information, the IFS used in the CS mechanism may be set to a distributed coordination function IFS (DIFS).

When the information on the secondary channel indicates that the secondary channel is not busy during the allocation period indicated by the allocation information, the predetermined length of the backoff time may be reduced compared to when the information on the secondary channel indicates that the secondary channel is busy during the allocation period indicated by the allocation information.

The CS mechanism may include a physical CS mechanism using the IFS determined based on the information on the secondary channel and a virtual CS mechanism using a network allocation vector (NAV) timer having a predetermined size.

In another aspect of the present disclosure, provided herein is a method of receiving, by a first STA, data from a second STA in a WLAN system. The method may include: receiving allocation information on a secondary channel of the WLAN system and information on the secondary channel from an AP; performing a CS mechanism using an IFS determined based on the information on the second channel within an allocation period on the secondary channel, wherein the allocation period is indicated by the allocation information; and receiving the data from the second STA during the allocation period from a time when it is determined by the performed CS mechanism that the secondary channel is an idle state.

In still another aspect of the present disclosure, provided herein is a STA device for transmitting data in a WLAN system. The STA device may include: a transceiver configured to exchange signals with one or more other STA devices with at least one radio frequency (RF) chain; and a processor connected to the transceiver and configured to process the signals exchanged with the one or more other STA devices. The processor may be configured to: receive allocation information on a secondary channel of the WLAN system and information on the secondary channel from an AP; perform a CS mechanism using an IFS determined based on the information on the second channel within an allocation period on the secondary channel, wherein the allocation period is indicated by the allocation information; and transmit the data to a second STA during the allocation period from a time when it is determined by the performed CS mechanism that the secondary channel is an idle state.

In a further aspect of the present disclosure, provided herein is a STA device for receiving data in a WLAN system. The STA device may include: a transceiver configured to exchange signals with one or more other STA devices with at least one RF chain; and a processor connected to the transceiver and configured to process the signals exchanged with the one or more other STA devices. The processor may be configured to: receive allocation information on a secondary channel of the WLAN system and information on the secondary channel from an AP; perform a CS mechanism using an IFS determined based on the information on the second channel within an allocation period on the secondary channel, wherein the allocation period is indicated by the allocation information; and receive the data from a second STA during the allocation period from a time when it is determined by the performed CS mechanism that the secondary channel is an idle state.

The effects that may be obtained by the present disclosure are not limited to the above-mentioned effects, and other effects not mentioned above will be clearly understood by those skilled in the art from the following description.

Advantageous Effects

According to the present disclosure, a STA device with the above configurations may transmit and receive data on a secondary channel of a system.

In particular, according to the configuration of the present disclosure, the STA device may perform data transmission and reception without consideration of a predetermined length of time (e.g., ProbeDelay) required for channel switching In addition, according to the configuration of the present disclosure, the STA device may attempt the data transmission and reception by applying a CS mechanism adaptively depending on the congestion level of the allocated secondary channel.

The effects that may be obtained by the present disclosure are not limited to the above-mentioned effects, and other effects not mentioned above will be clearly understood by those skilled in the art from the following description.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 16 to 19 are diagrams for explaining the operation of a STA when the STA is allocated a secondary channel CH 2 according to the present disclosure;

BEST MODE

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure.

The following detailed description includes specific details in order to provide a thorough understanding of the present disclosure. However, it will be apparent to those skilled in the art that the present disclosure may be practiced without such specific details. In some instances, known structures and devices are omitted or are shown in block diagram form, focusing on important features of the structures and devices, so as not to obscure the concept of the present disclosure.

As described above, a detailed description will be given of the introduction of the concept of a downlink oriented channel, and a method and apparatus for conducting communication using a downlink oriented channel in a high-density Wireless Local Area Network (WLAN) system.

1. Wireless LAN (WLAN) System

1.1. Generals of WLAN System

Figure 1:
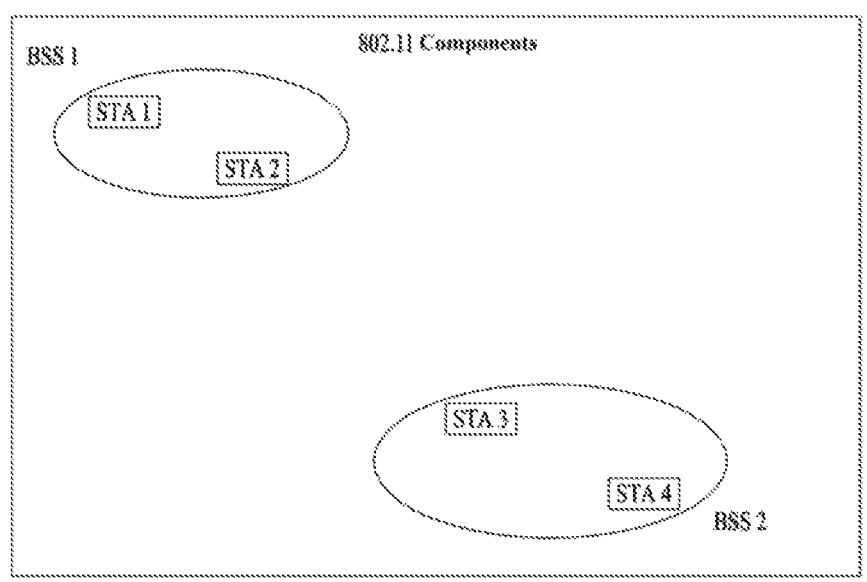
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

A STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called a STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
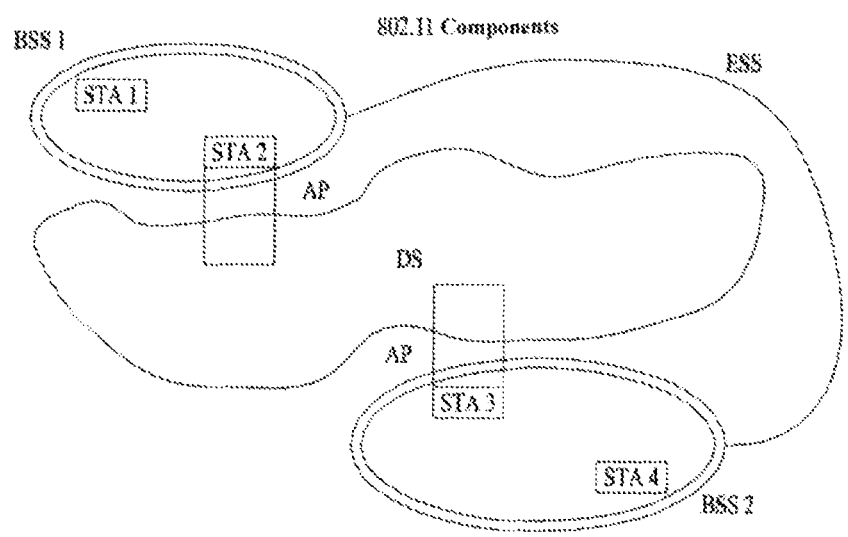
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Based on the above, a method of channel bonding in the WLAN system will be described.

1.2. Channel Bonding in WLAN System

Figure 3:
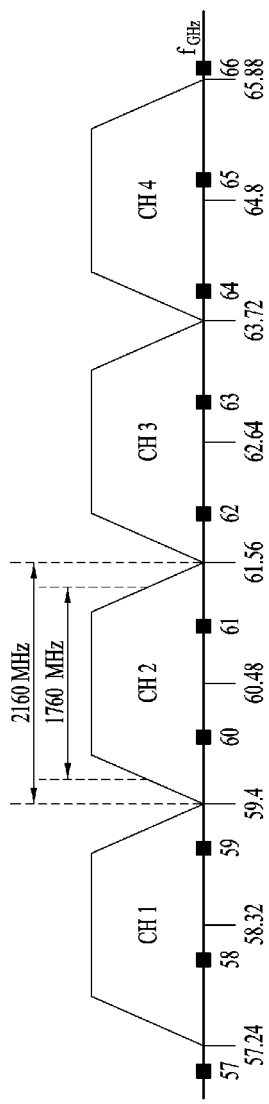
FIG. 3 is a diagram illustrating a channel in a 60 GHz band for explaining a channel bonding operation according to an embodiment of the present disclosure.

FIG. 3 is a diagram illustrating a channel in a 60 GHz band for explaining a channel bonding operation according to an embodiment of the present disclosure.

As shown in FIG. 3, four channels may be configured in the 60 GHz band, and the typical channel bandwidth may be 2.16 GHz. The ISM band (57 GHz to 66 GHz) available at 60 GHz may be specified differently for different countries. In general, channel 2 of the channels shown in FIG. 3 is available in all regions and may be used as a default channel. Most of the regions, except Australia, may use channels 2 and 3, which may be utilized for channel bonding. However, the channels used for channel bonding may vary, and the present disclosure is not limited to a specific channel.

Figure 4:
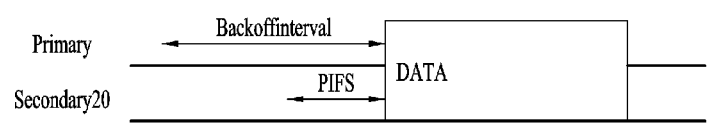
FIG. 4 illustrates a basic method of performing channel bonding in a WLAN system.

FIG. 4 illustrates a basic method of performing channel bonding in a WLAN system.

The example of FIG. 4 illustrates the operation of 40 MHz channel bonding performed by combining two 20 MHz channels in the IEEE 802.11n system. For IEEE 802.11ac, 40/80/160 MHz channel bonding may be performed.

The two channels exemplarily shown in FIG. 4 include a primary channel and a secondary channel, and the STA may review the channel status of the primary channel of the two channels in the CSMA/CA manner. If the secondary channel is idle for a predetermined time (e.g., PIFS) while the primary channel is idle during a certain backoff interval and the backoff count becomes 0, the STA may transmit data by bonding the primary channel and the secondary channel.

In the case where channel bonding is performed based on contention as shown in FIG. 4, channel bonding is allowed only when the secondary channel remains idle for a predetermined time at the time when the backoff count for the primary channel expires, and therefore the application of channel bonding is very limited, and it is difficult to flexibly cope with the media situation.

Accordingly, in one aspect of the present disclosure, an AP may transmit scheduling information to STAs to perform access based on scheduling. Meanwhile, in another aspect of the present disclosure, channel access may be performed based on the above-described scheduling or on contention independently of the above-described scheduling. In yet another aspect of the present disclosure, communication may be performed based on beamforming using a spatial sharing technique.

1.3. Beacon Interval Configuration

Figure 5:
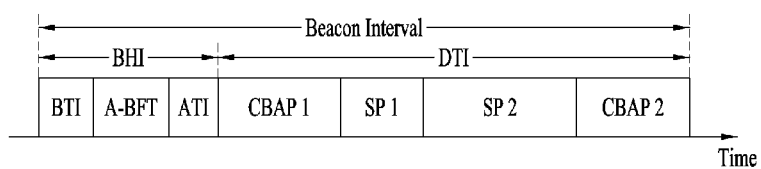
FIG. 5 is a diagram illustrating configuration of a beacon interval.

FIG. 5 is a diagram illustrating configuration of a beacon interval.

In 11ad-based DMG BSS systems, the media time may be divided into beacon intervals. The sub-intervals within a beacon interval may be referred to as access periods. Different access intervals within one beacon interval may have different access rules. The information on the access intervals may be transmitted to a non-AP STA or a non-PCP by the AP or Personal Basic Service Set Control Point (PCP).

As shown in FIG. 5, one beacon interval may include one beacon header interval (BHI) and one data transfer interval (DTI). The BHI may include a beacon transmission interval (BTI), an association beamforming training (A-BFT) interval, and an announcement transmission interval (ATI) as shown in FIG. 5.

The BTI refers to an interval during which one or more DMG beacon frames may be transmitted. The A-BFT interval refers to an interval during which beamforming training is performed by a STA that has transmitted the DMG beacon frame during the preceding BTI. The ATI refers to a request-response-based management access interval between a PCP/AP and a non-PCP/non-AP STA.

Meanwhile, the data transfer interval (DTI) is an interval during which frame exchange is performed between STAs, and may be allocated one or more Contention Based Access Periods (CBAPs) and one or more service periods (SPs) as shown in FIG. 5. Although FIG. 5 illustrates an example of allocation of two CBAPs and two SPs, this is illustrative and not restrictive.

Hereinafter, the physical layer configuration in a WLAN system to which the present disclosure is applied will be described in detail.

1.4. Physical Layer Configuration

It is assumed that the following three different modulation modes may be provided in the WLAN system according to an embodiment of the present disclosure.

TABLE 1

| PHY | MCS | Note |
|---|---|---|
| Control PHY | 0 | |
| Single carrier PHY (SC PHY) | 1 ... 12 25 ... 31 | (low power SC PHY) |
| OFDM PHY | 13 ... 24 | |

Such modulation modes may be used to satisfy different requirements (e.g., high throughput or stability). Depending on the system, only some of these modes may be supported.

Figure 6:
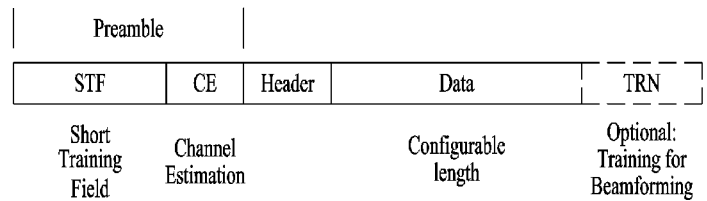
FIG. 6 is a diagram illustrating a physical configuration of an existing radio frame.

FIG. 6 is a diagram illustrating a physical configuration of an existing radio frame.

It is assumed that all the Directional Multi-Gigabit (DMG) physical layers include fields as shown in FIG. 6 in common. However, depending on the respective modes, physical layers may have a different method of defining individual fields and use a different modulation/coding scheme.

As shown in FIG. 6, the preamble of a radio frame may include a Short Training Field (STF) and Channel Estimation (CE). In addition, the radio frame may include a header and a data field as payload, and selectively include a TRN (Training) field for beamforming.

Figure 7:
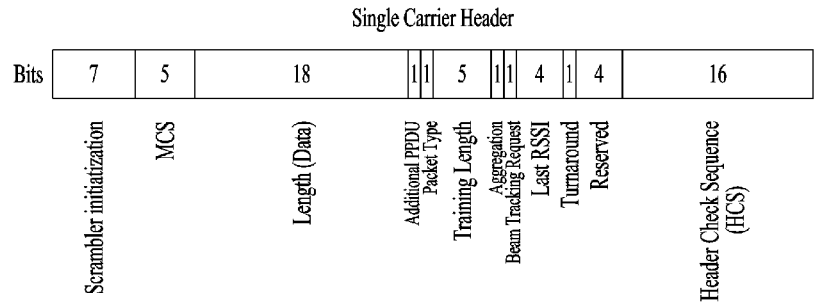
FIGS. 7 and 8 are diagrams illustrating configuration of the header field of the radio frame of FIG. 6.
Figures 8, 9:
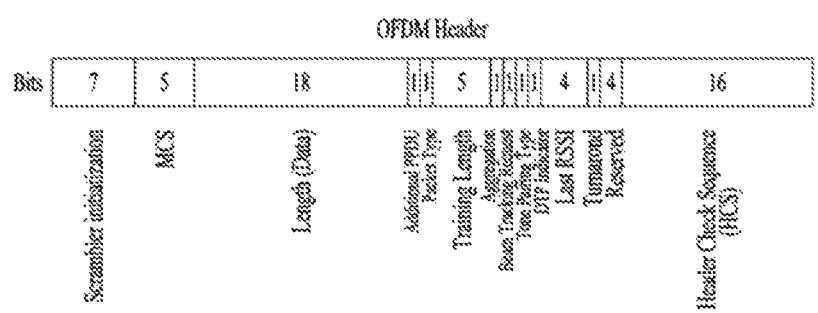
FIG. 9 is a diagram showing a PPDU structure applicable to the present disclosure.

FIGS. 7 and 8 are diagrams illustrating configuration of the header field of the radio frame of FIG. 6.

Specifically, FIG. 7 illustrates a case where an Single Carrier (SC) mode is used. In the SC mode, the header may include information indicating an initial value of scrambling, a Modulation and Coding Scheme (MCS), information indicating the length of data, information indicating the presence or absence of an additional Physical Protocol Data Unit (PPDU), a packet type, a training length, an aggregation status, a beam training request status, a last Received Signal Strength Indicator (RSSI), a truncation status, and a Header Check Sequence (HCS). In addition, as shown in FIG. 7, the header has 4 reserved bits. The reserved bits may be utilized in the following description.

FIG. 8 specifically illustrates configuration of a header in a case where the OFDM mode is applied. The OFDM header may include information indicating an initial value of scrambling, an MCS, information indicating the length of data, information indicating the presence or absence of additional PPDU, a packet type, a training length, an aggregation status, a beam training request status, a last RSSI, a truncation status, and an HCS. In addition, as shown in FIG. 8, the header has 2 reserved bits. The reserved bits may be utilized in the following description as in the case of FIG. 7.

As described above, the IEEE 802.11ay system is considering introduction of channel bonding and MIMO technology in the legacy 11ad system for the first time. In order to implement channel bonding and MIMO in 11ay, a new PPDU structure is needed. In other words, the existing 11ad PPDU structure has limitations in supporting legacy UEs and implementing channel bonding and MIMO.

For this, a legacy preamble for supporting a legacy UE and a new field for a 11ay UE following a legacy header field may be defined, and channel bonding and MIMO may be supported through the newly defined field.

FIG. 9 is a diagram showing a PPDU structure according to a preferred embodiment of the present disclosure. In FIG. 9, the abscissa may correspond to the time domain, and the ordinate may correspond to the frequency domain.

When two or more channels are bonded, a frequency band (for example, a 400 MHz band) may exist between frequency bands (e.g., 1.83 GHz) used in the respective channels. In the mixed mode, a legacy preamble (legacy STF, legacy CE) is transmitted in duplicate through each channel. In an embodiment of the present disclosure, transmitting the new STF and CE field (gap filling) preamble through the 400 MHz band between the channels along with transmission of the legacy preamble may be considered.

In this case, as shown in FIG. 9, in the PPDU structure according to the present disclosure, ay STF, ay CE, ay header B, and payload are transmitted over broadband after a legacy preamble, a legacy header and an ay header A. Therefore, the ay header, ay Payload field, and the like to be transmitted after the header field may be transmitted through channels used for bonding. In order to distinguish the ay header from the legacy header, the ay header may be referred to as an enhanced directional multi-gigabit (EDMG) header, or "ay header" and "EDMG header" may be interchangeably used.

For example, a total of six or eight channels (2.16 GHz) may be present in 11ay, and up to four channels may be bonded and transmitted to a single STA. Thus, the ay header and the ay payload may be transmitted over bandwidths of 2.16 GHz, 4.32 GHz, 6.48 GHz, and 8.64 GHz.

Alternatively, the PPDU format used when the legacy preamble is repeatedly transmitted without performing the gap-filling described above may also be considered.

In this case, the gap-filling is not performed, and thus the ay STF, ay CE, and ay header B are transmitted in a wideband after the legacy preamble, legacy header, and ay header A, without the GF-STF and GF-CE field indicated by the dotted line in FIG. 9.

Figure 10:
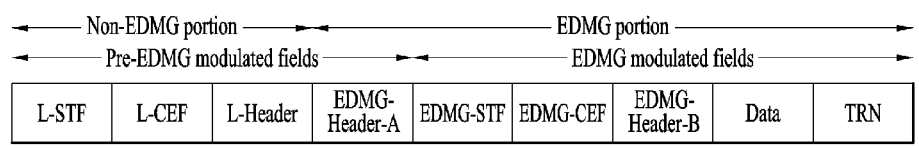
FIG. 10 is a diagram simply illustrating a PPDU structure applicable to the present disclosure.

FIG. 10 is a diagram simply illustrating a PPDU structure applicable to the present disclosure. The aforementioned PPDU format can be summarized as FIG. 10.

As shown in FIG. 10, a PPDU format applicable to 11ay system can include such a field as L-STF, L-CE, L-Header, EDMG-Header-A, EDMG-STF, EDMG-CEF, EDMG-Header-B, Data, and TRN field. The above fields can be selectively included according to a form (e.g., SU PPDU, MU PPDU, etc.) of a PPDU.

In this case, a portion including the L-STF, the L-CE, and the L-header fields can be referred to as a non-EDMG portion and the remaining portion can be referred to as an EDMG portion. And, the L-STF, the L-CE, the L-Header, and the EDMG-Header-A fields can be referred to as pre-EDMG modulated fields and the remaining portion can be referred to as an EDMG modulated field.

The (legacy) preamble part of the PPDU may be used for packet detection, automatic gain control (AGC), frequency offset estimation, synchronization, indication of modulation (SC or OFDM), and channel estimation. The format of the preamble may be common to both OFDM packets and SC packets. Here, the preamble may include a short training field (STF) and a channel estimation (CE) field, which is located behind the STF.

2. Channel Allocation Method Applicable to the Present Disclosure

Hereinafter, a channel allocation method applicable not only to the 11ay system to which the present disclosure is applicable but also to other Wi-Fi systems including IEEE 802.11n, 802.11ac, and 802.11ax systems will be described in detail.

The term "flay STA" described herein may refer a device proposed in the present disclosure (e.g., UE, STA, AP, etc.), which is capable of supporting the 802.11ay system. In addition, the term "11ay STA" may be further interpreted as a device capable of implementing all the features proposed in the present disclosure even if the device operates in other systems (IEEE 802.11n system, 802.11ac system, 802.11ax system, or other Wi-Fi systems). Thus, a STA operating as proposed in the present disclosure is called "11ay STA", and the operation of the STA will be described in detail.

Figure 11:
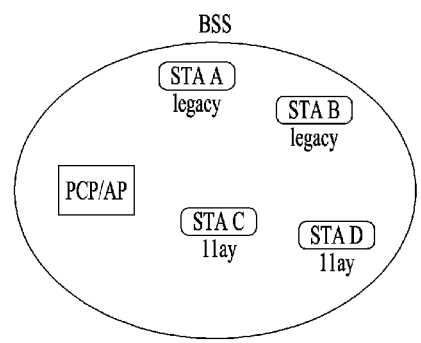
FIG. 11 is a diagram illustrating a case in which a plurality of UEs exist in one BSS.

FIG. 11 is a diagram illustrating a case in which a plurality of UEs exist in one BSS.

As shown in FIG. 11, one BSS may include a PCP/AP and multiple STAs. In this case, the PCP/AP may allocate a channel for data transmission and reception to each of the multiple STAs.

In FIG. 11 and other figures, a legacy STA may refer to a STA incapable of supporting secondary channel allocation operation proposed in the present disclosure. However, considering that FIG. 11 shows an example of the present disclosure, a STA capable of supporting the channel allocation operation proposed in the present disclosure may be applied instead of the legacy STA in FIG. 11 in another example of the present disclosure.

Figure 12:
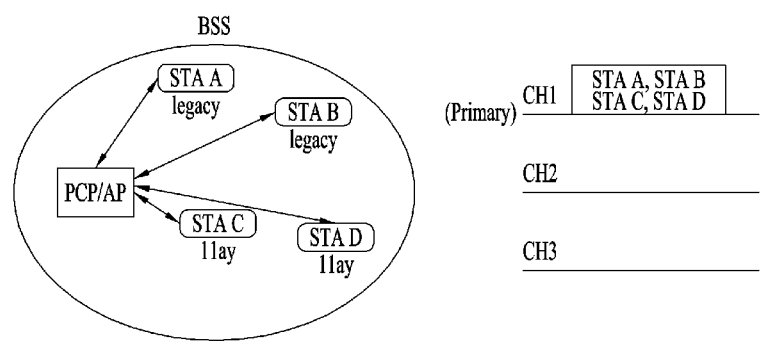
FIG. 12 is a diagram schematically illustrating an operation of establishing a BSS during a beacon header interval (BHI)

FIG. 12 is a diagram schematically illustrating an operation of establishing a BSS during a beacon header interval (BHI).

As shown in FIG. 12, during a BSS establishment or association process, all STAs (e.g., legacy and flay STAs) associated with a PCP/AP may transmit and receive relevant signals on a single channel among channels supported by the system. In this case, the single channel may correspond to a primary channel supported by the system.

Specifically, all STAs in the BSS may exchange control information and management information with the PCP/AP over the primary channel before the PCP/AP allocates channels for data transmission and reception.

For example, the legacy STA may establish a link with the PCP/AP through the DMG Operation element and DMG Capabilities element. On the other hand, the 11ay STA may establish a link with the PCP/AP by modifying reserved bits included in the DMG Operation element and DMG Capabilities element defined in the conventional system or defining new EDMG Operation element and EDMG Capabilities element.

The PCP/AP may check whether the 11ay STA is capable of supporting multi-channel operation through a negotiation process.

The 11ay STA may receive information on the primary channel and information on secondary channels through the DMG Operation element and DMG Capabilities element while establishing the link with the PCP/AP.

In another example of the present disclosure, when the PCP/AP supports multi-channel or wide bandwidth capacity (capability), the PCP/AP may use the secondary channels for transmitting and receiving the control information or management information to and from multiple STAs.

Additionally, the PCP/AP may transmit grant frames to one or more STAs over the primary channel during a data transmission interval (DTI) before completing channel allocation. By doing so, the PCP/AP may transmit channel allocation information to the STAs.

In other words, according to the present disclosure, the PCP/AP may transmit the channel allocation information to the one or more STAs over the primary channel during the BHI or some parts of the DTI. Accordingly, the one or more STAs may be allocated one or more channels within the DTI.

Figure 13:
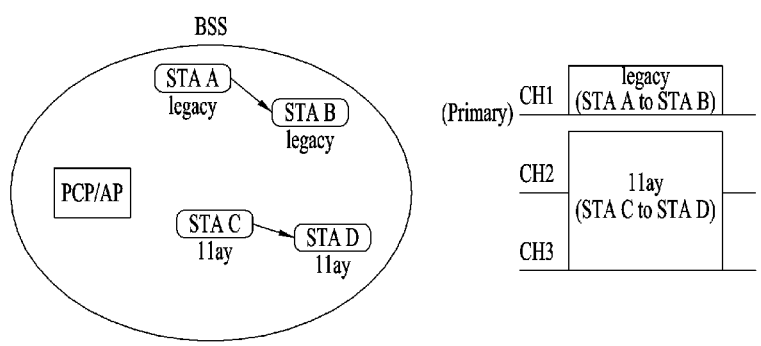
FIG. 13 is a diagram schematically illustrating a signal transmission and reception operation between STAs having allocated channels.

FIG. 13 is a diagram schematically illustrating a signal transmission and reception operation between STAs having allocated channels.

As shown in FIG. 13, each STA may exchange data or frames with a peer STA (or a PCP/AP) over an allocated channel during a DTI. For example, STA A corresponding to the legacy STA may transmit data to STA B on CH 1, and STA C corresponding to the 11ay STA may transmit data to STA D on CH 2 and CH 3. In this case, if one of CH 2 and CH 3 is busy, STA C may use one of the two channels to transmit the data.

Figure 14:
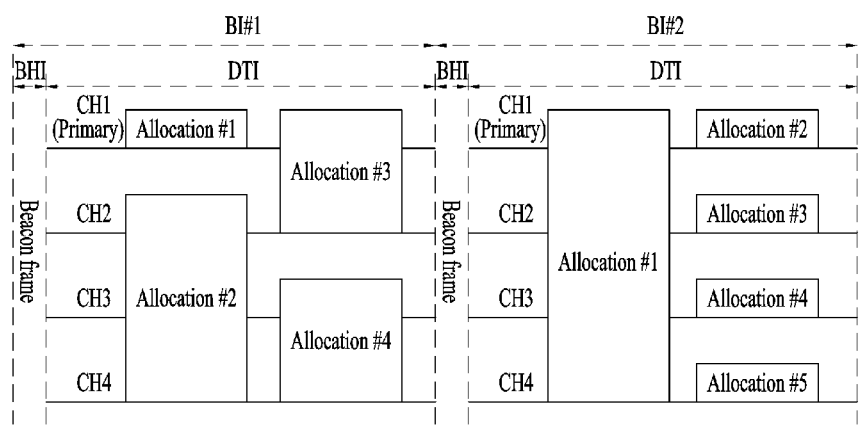
FIG. 14 is a diagram schematically illustrating an operation of allocating a channel through a beacon frame transmitted within a BHI.

FIG. 14 is a diagram schematically illustrating an operation of allocating a channel through a beacon frame transmitted within a BHI.

As shown in FIG. 14, a specific STA may be allocated one or multiple channels during a specific DTI through the beacon frame transmitted during the BHI. Here, the one channel may be a primary channel or a channel other than the primary channel (e.g., a secondary channel), and the multiple channels may or may not include the primary channel.

Based on the above operation, a PCP/AP may perform channel allocation for one or more STAs in each beacon interval (BI).

Figure 15:
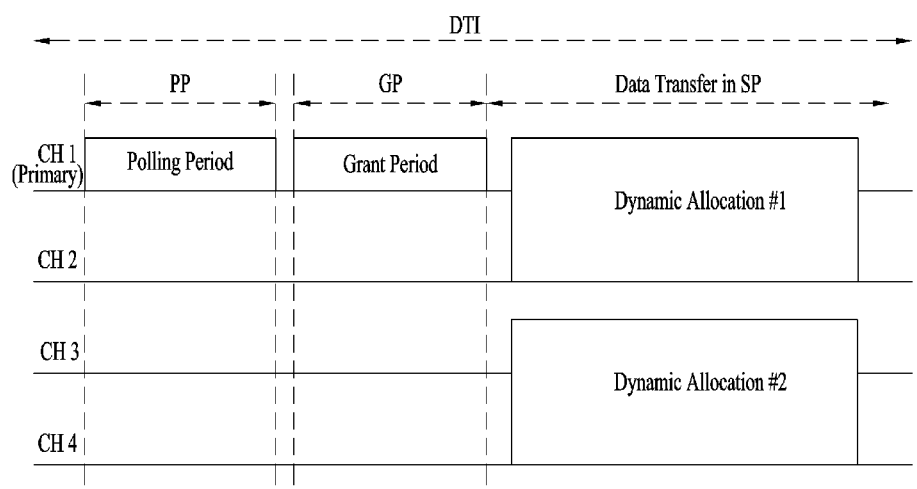
FIG. 15 is a diagram schematically illustrating an operation of dynamically allocating at least one channel through a grant frame transmitted within a DTI.

FIG. 15 is a diagram schematically illustrating an operation of dynamically allocating at least one channel through a grant frame transmitted within a DTI.

As shown in FIG. 15, the DTI according to the present disclosure may be divided into a polling period (PP), a grant period (GP), and an allocation period.

The PP refers to a period in which a PCP/AP or a special STA transmits a poll frame to one or more STAs to take a poll about dynamical allocation during a DTI and then receive a service period request (SPR) frame from the one or more STAs. In this case, the PCP/AP or special STA may transmit different poll frames to the one or more STAs and then receive SPR frames respectively corresponding to the poll frames from the one or more STAs.

When receiving the poll frame from the PCP/AP or special STA as described above, a specific STA may transmit the SPR frame in response to the poll frame to the PCP/AP or special STA.

However, in this case, the one or more STAs do not need to mandatorily transmit the SPR frame in response to the poll frame. That is, the one or more STAs may autonomously determine whether to transmit the SPR frame.

Further, the PP may or may not exist within the DTI.

The GP refers to a period in which the PCP/AP or special STA transmits a grant frame to the one or more STAs such that the one or more STAs are allocated the allocation period with a predetermined length.

In the case of scheduling through a beacon or notification frame shown in FIG. 14, the PCP/AP may perform scheduling operation through the beacon or notification frame, which is transmitted during the BHI, within the DTI behind the BHI. However, considering that the beacon or notification frame is transmitted only during the BHI, there may be limitations on dynamic control of the scheduling operation within the DTI.

Meanwhile, since the grant frame is transmitted within the DTI such that the one or more STAs are allocated the allocation period with the predetermined length, the grant frame may support flexible channel allocation compared to the beacon or notification frame.

The allocation period refers to a period in which data is transmitted and received over at least one channel in a channel period that is dynamically allocated through the grant frame. Specifically, the allocation period may refer to one of the following in the channel period dynamically allocated through the grant frame: (1) a period in which data is transmitted and received over the primary channel of the system (system primary channel); (2) a period in which data is transmitted and received over a channel except the primary system channel; (3) a period in which data is transmitted and received over multiple channels including the primary system channel; and (4) a period in which data is transmitted and received over multiple channels except the primary system channel. In this case, multiple channels may be bonded or aggregated to transmit and receive data over the multiple channels.

3. Embodiments Applicable to the Present Disclosure

Hereinafter, a description will be given of how a STA transmits and receives data in a BSS when the STA is allocated a secondary channel(s) with no primary channel in various ways as described above.

In this case, it is assumed that the STA receives a frame including channel allocation information during a BHI or GP and then recognizes that the secondary channel (e.g., CH 2) is allocated by decoding the received frame. For convenience of description, it is assumed that the STA is allocated only one secondary channel. However, the allocated one secondary channel may be extended to include one or multiple channels with various bandwidth except the primary channel.

In this case, since the primary channel carrying the frame including the channel allocation information (e.g., a beacon or grant frame) is different from the secondary channel allocated based on the received frame, the STA needs to perform channel switching from the primary channel (e.g., CH 1) to the allocated secondary channel (e.g., CH 2).

According to IEEE 802.11 standard, when a STA switches to a new operating channel (e.g., the allocated secondary channel CH 2), the STA needs to perform clear channel assessment (CCA) until a frame sequence capable of correctly setting a network allocation vector (NAV) is detected or until a period of time equal to ProbeDelay expires.

However, when the STA operates as described above, it may be difficult for the STA to perform data transmission and reception during a period where the allocation period overlaps with ProbeDelay.

Therefore, the present disclosure proposes a method of enabling a STA to perform data transmission and reception on an allocated secondary channel during an allocated period without consideration of ProbeDelay.

Hereinafter, a description will be given of how a STA operates after a secondary channel (e.g., CH 2) among BSS operating channels is allocated to the STA in various ways as described above. In particular, the present disclosure describes STA operation when a STA is allocated a contention based access period (CBAP) over a secondary channel.

3.1. Beginning of Secondary Channel Allocation

Figure 16:
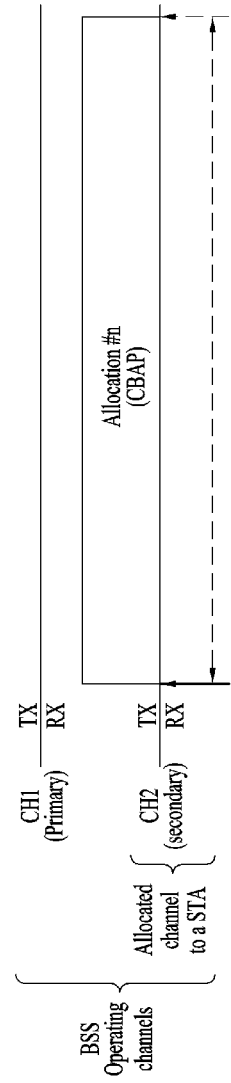

FIG. 16 is a diagram for explaining STA operation according to the present disclosure when allocation of a secondary channel CH 2 to a STA is started.

According to the present disclosure, the STA may perform a channel sensing (CS) mechanism at the time shown in FIG. 16 (at the time when the CH 2 allocation is started).

If the allocated channel is not a primary channel supported by the system as shown in FIG. 16, the STA may not perform the CS mechanism for the primary channel. That is, the STA may perform the CS mechanism only for the secondary channel.

Figure 17:
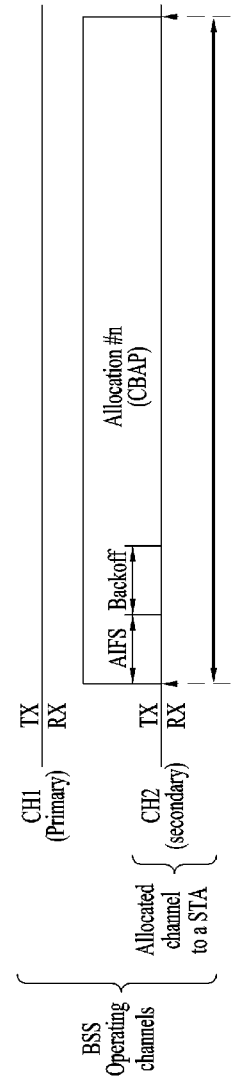

In other words, the STA may perform the CS mechanism for the secondary channel at the beginning of a secondary channel allocation period without consideration of Probe-Delay 3.2. Channel Access During Secondary Channel Allocation FIG. 17 is a diagram for explaining STA operation according to the present disclosure while the secondary channel CH 2 is allocated to the STA.

First, the STA may use the CS mechanism to determine the state of the allocated channel (or medium). In this case, the CS mechanism may include at least one of a physical CS function and a virtual CS function.

In other words, the STA may apply at least one of a physical CS mechanism and a virtual CS mechanism. When the STA applies both the physical CS mechanism and the virtual CS mechanism, if any one of the two CS functions indicates that the corresponding medium is busy, the STA needs to regard that the channel (or medium) is busy. Otherwise, the STA regards that the channel (or medium) is idle.

The physical CS mechanism is provided by a higher layer, and the virtual CS mechanism is provided by a medium access control (MAC) layer. In this case, the virtual CS mechanism may be referred to as the NAV.

Thus, according to the present disclosure, the STA may use at least one of the physical and virtual CS mechanisms to perform data transmission and reception on the allocated secondary channel CH 2.

For example, the STA may determine the state of the secondary channel CH 2 by applying the physical CS mechanism to the allocated secondary channel CH 2. To this end, the STA may determine whether the secondary channel CH 2 is idle during a period of time equal to or in excess of an arbitration interface space (AIFS) or a distributed coordination function interframe space (DCF interframe space or DIFS).

If it is determined that the secondary channel CH 2 is idle, the STA may perform the data transmission and reception on the secondary channel CH 2 during the allocation period.

Additionally, after performing a backoff procedure after an IFS (e.g., AIFS or DIFS) applied to the physical CS mechanism, the STA may perform the data transmission and reception on the secondary channel CH 2 during the allocation period. In this case, the backoff procedure may mean that the STA waits for a random backoff time and then performs the data transmission reception after the IFS applied to the physical CS mechanism.

In an example of the present disclosure, the AIFS may be determined and applied based on the priority (or access category) of data to be transmitted by considering quality of service (QoS) based on the physical CS mechanism. The AIFS per access category [AC] may be determined by Equation 1 below.

$$AIFS[AC]=AIFSN[AC]*aSlotTime+aSIFSTime \quad \text{[Equation 1]}$$

In Equation 1, aSIFSTime denotes a short interframe space (SIFS) time, and aSlotTime denotes a slot time. In this case, aSIFSTime has a fixed value, and aSlotTime may vary dynamically depending on a radio propagation time (aAirPropagationTime).

In addition, AIFSN [AC] may change depending on the access category. The access category may be one of the following: background (BK), best effort (BE), video (VI), and voice (VO). For example, AIFSN [AC] may be determined as follows: AIFSN [AC_BK]=7, AIFSN [AC_BE]=3, and AIFSN [AC_VI]=AIFSN [AC_VO]=2.

In this case, according to the present disclosure, the STA may determine whether the secondary channel CH 2 is idle, using the physical CS mechanism from the time when the secondary channel CH 2 is allocated during an AIFS period, which depends on the priority (or access category) of data to be transmitted. When the random backoff time elapses, the STA may perform the data transmission and reception after the AIFS period.

When the STA determines, through the physical CS mechanism, that the corresponding channel (or medium) is busy, the STA needs to defer signal transmission and reception on the channel (or medium) or set the NAV until it is determined that the channel (or medium) is idle.

In particular, according to the present disclosure, when a specific STA is allocated a secondary channel as described above, the STA may adjust the AIFS per category and backoff value for traffic depending on the state of the allocated secondary channel (for example, the STA may reduce the AIFS per category and backoff value). By doing so, the STA may not only reduce signaling overhead but also transmit more data within an allocation period.

To this end, the PCP/AP may provide the STA with information on whether the allocation period of the corresponding channel is dense together with channel allocation information (e.g., allocation information about CH 2). In this case, the information on whether the allocation period of the corresponding channel is dense may correspond to, for example, information on whether the number of STAs capable of using the corresponding allocation period is more than (or less than) a predetermined value or information on whether the probability that the STA transmits and receives data in the corresponding allocation period is more than (or less than) a predetermined value.

Based on the information, the STA may apply, as the IFS to which the physical CS mechanism is applied, the AIFS determined based on the category (e.g., access category) of the data or the DIFS smaller than the AIFS. In addition, based on the information, the STA may perform the data transmission and reception after the IFS, where the physical CS mechanism is applied, after expiration of a randomly determined first backoff time (or a backoff time determined based on the size of a first contention window depending on the category (e.g., access category) of the data) or a second backoff time smaller than the first backoff time (or a backoff time determined based on the size of a contention window smaller than the first contention window).

Specifically, when the PCP/AP indicates that the allocation period of the channel is dense, the STA may attempt the data transmission and reception by applying the CS mechanism, which is based on the AIFS preconfigured for the data. Additionally, when a random backoff procedure is performed, the STA may attempt the data transmission and reception after a lapse of a random backoff time after completing the CS mechanism.

On the contrary, when the PCP/AP indicates that the allocation period of the channel is not dense, the STA may attempt the data transmission and reception by performing the CS mechanism, which is based on the DIFS rather than the AIFS preconfigured for the data. Additionally, when a random backoff procedure is performed, the STA may attempt the data transmission and reception after a lapse of a backoff time corresponding to half of a randomly determined backoff time after completing the CS mechanism.

FIG. 18 is a diagram illustrating data formats for transmitting channel allocation information according to the present disclosure.

The PCP/AP may transmit at least one piece of channel allocation information to the STA using the EDMG Extended Schedule element format shown in FIG. 18. In this case, a Channel Allocation field for a specific channel may vary depending on scheduling types as shown in FIG. 18. The PCP/AP may indicate whether the specific channel is sufficiently dense or not, using a reserved bit(s) in the Channel Allocation field for the specific channel (e.g., 0 may indicate that the specific channel is sufficiently dense, and 1 may indicate that the specific channel is not sufficiently dense).

According to the present disclosure, the STA may apply a full CS (physical CS+virtual CS) mechanism to the secondary channel allocated for the data transmission and reception during the channel allocation period in contrast to the above.

In this case, the STA may apply the virtual CS mechanism to the allocated channel separately (or together) with the physical CS mechanism. To this end, the STA may configure or reconfigure a NAV timer based on the allocated channel.

When the STA applies the full CS mechanism to the allocated channel, the STA may perform the data transmission and reception only if all results of the physical CS mechanism and virtual CS mechanism indicate the idle state. In this case, if a backoff procedure is additionally performed, the STA may perform the data transmission and reception after a lapse of a random backoff time after completing the full mechanism.

3.3. End of Secondary Channel Allocation

Figure 19:
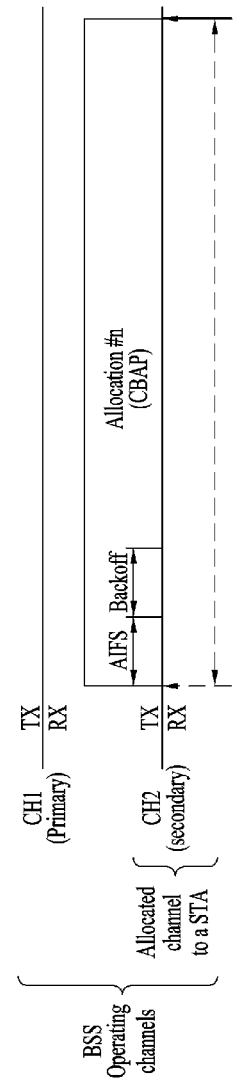

FIG. 19 is a diagram for explaining STA operation according to the present disclosure when the allocation of the secondary channel CH 2 to the STA is ended.

After completing the data transmission and reception by performing the CS mechanism during the allocated channel period, the STA may perform the CS mechanism again as follows at the end of the second channel allocation.

(1) If there is no other allocation scheduled within the current DTI (for example, when there is no other (channel) allocation scheduled within the DTI where the secondary channel CH 2 is allocated), the STA may perform the CS mechanism for the primary channel to receive a beacon frame or an announce frame from the PCP/AP.

For example, when there is no additional channel allocation after the allocated secondary channel within a specific DTI, the STA may perform the CS mechanism for the primary system channel at the end of the secondary channel allocation.

(2) If there is other allocation scheduled during the current DTI (for example, when there is other (channel) allocation scheduled within the DTI where the secondary channel CH 2 is allocated), the STA may perform the CS mechanism for an allocated channel.

For example, when there is additional channel allocation after the allocated secondary channel within a specific DTI, the STA may perform the CS mechanism for the additionally allocated channel (e.g., primary channel or secondary channel) at the end of the secondary channel allocation.

Figure 20:
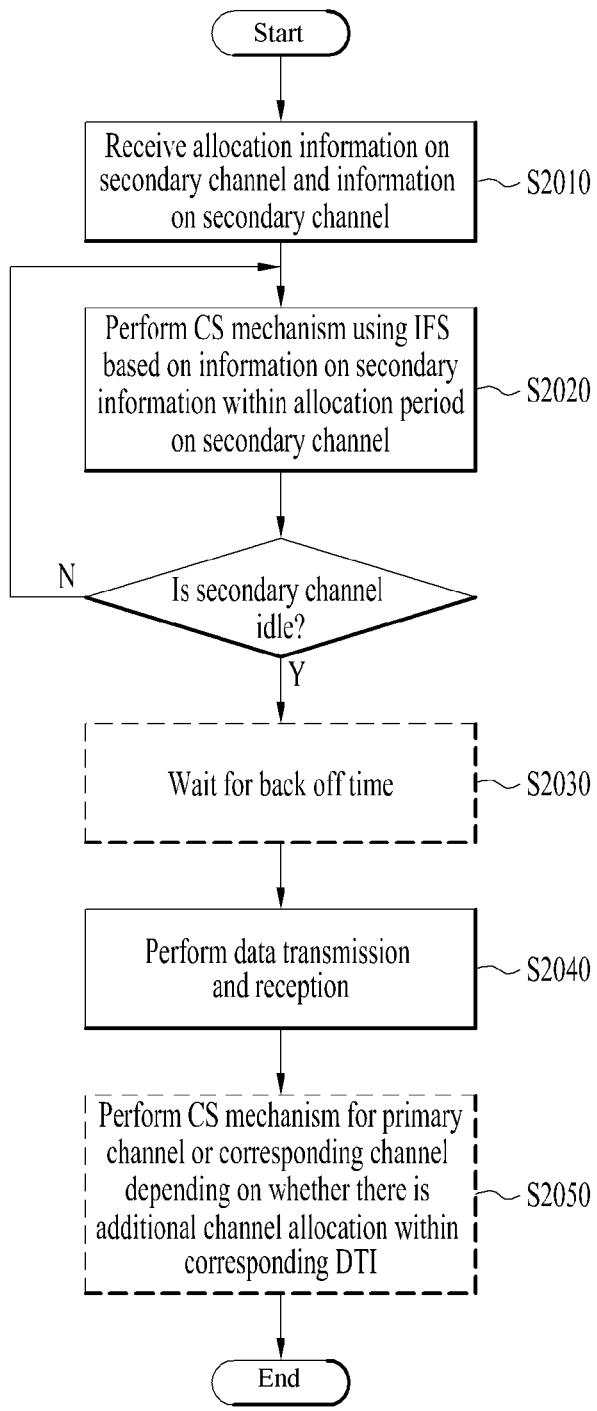
FIG. 20 is a flowchart illustrating an operation in which a STA transmits and receives data on a secondary channel of a system according to the present disclosure.

FIG. 20 is a flowchart illustrating an operation in which a STA transmits and receives data on a secondary channel of a system according to the present disclosure.

First, the STA may receive allocation information on the secondary channel of the system and information on the secondary channel from a PCP/AP (S2010).

In this case, the allocation information on the secondary channel may correspond to information indicating an allocation period within a specific DTI where the STA is capable of performing signal transmission and reception.

The information on the secondary channel may correspond to information indicating whether the secondary channel is busy during the allocation period indicated by the allocation information (for example, whether the secondary channel is dense or not during the allocation period).

The information received in step S2010 may be received over a primary channel of the system. In some embodiments or cases, the information received in step S2010 may be received within a BHI or a DTI on the primary channel.

The STA may perform a CS mechanism using an IFS determined based on the information on the secondary channel during the allocation period on the secondary channel, which is indicated by the allocation information (S2020).

For example, the STA may perform a physical CS mechanism using an AIFS or a DIFS per category for data to be transmitted, based on the information on the secondary channel received in step S2010. Thereafter, the STA may determine whether the allocated secondary channel is in an idle state.

Then, the STA may exchange data with other STAs during the allocation period after when it is determined by the performed CS mechanism that the secondary channel is in the idle state (S2040).

When a backoff procedure is additionally performed, the STA may perform the data transmission and reception after a lapse of a predetermined length of a backoff time (S2030) after when it is determined by the performed CS mechanism that the second channel is in the idle state (S2040).

In an example of the present disclosure, when the STA performs the data transmission and reception based on the CS mechanism and the backoff procedure, the IFS used in the CS mechanism and the predetermined length of the backoff time used in the backoff procedure may be configured differently depending on the information on the secondary channel received in step S2010.

For example, when the information on the secondary channel indicates that the secondary channel is busy during the allocation period indicated by the allocation information, the IFS used in the CS mechanism may be set to the AIFS per category for the data.

As another example, when the information on the secondary channel indicates that the secondary channel is not busy during the allocation period indicated by the allocation information, the IFS used in the CS mechanism may be set to the DIFS.

In addition, when the information on the secondary channel indicates that the secondary channel is not busy during the allocation period indicated by the allocation information, the predetermined length of the backoff time used in the backoff procedure may be reduced, compared to when the information on the secondary channel indicates that the secondary channel is busy during the allocation period indicated by the allocation information.

When the data transmission and reception is completed or when the allocation period allocated for the STA expires, the STA may perform an additional CS mechanism.

In this case, a channel where the STA performs the additional CS mechanism may depend on whether there is additional channel allocation within the DTI where the data transmission and reception is performed.

For example, if there is additional channel allocation within the corresponding DTI, the STA may perform the CS mechanism for a corresponding channel (e.g., an additionally allocated channel) when the data transmission and reception at step S2040 is completed or when the allocation period allocated for the STA expires. By doing so, the STA may prepare signal transmission and reception on the additionally allocated channel.

As another example, if there is no additional channel allocation within the corresponding DTI, the STA may perform the CS mechanism for the primary channel of the system when the data transmission and reception at step S2040 is completed or when the allocation period allocated for the STA expires. By doing so, the STA may prepare reception of control information to be transmitted from the PCP/AP.

Additionally, the STA may perform, as the CS mechanism, both the physical CS mechanism using the IFS determined based on the information on the secondary channel and a virtual CS mechanism using a NAV timer having a predetermined size. In this case, the STA may perform the data transmission and reception only when it is determined by both the physical and virtual CS mechanisms that the secondary channel is in the idle state.

4. Device Configuration

Figure 21:
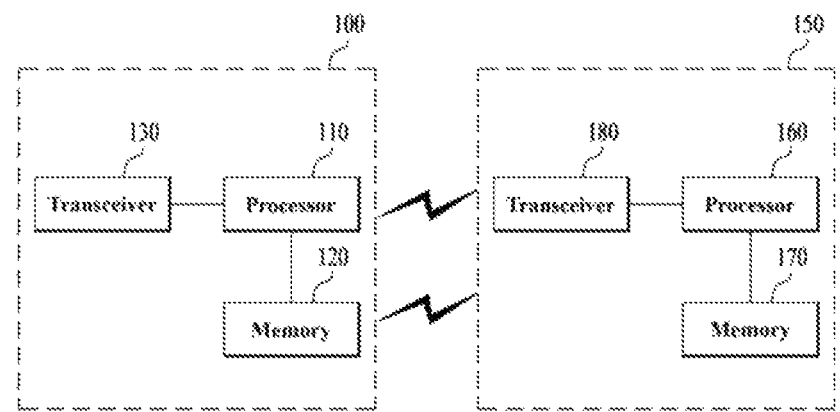
FIG. 21 is a diagram for explaining devices for implementing the above-described methods.

FIG. 21 is a diagram for explaining devices for implementing the aforementioned method.

In FIG. 21, a wireless device 100 and a wireless device 150 may correspond to a STA configured to transmit data and a STA configured to receive data, which are described above, respectively.

In this case, the STA configured to transmit data may correspond to an 11ay UE or a PCP/AP supporting the flay system, and the STA configured to receive data may correspond to an 11ay UE or a PCP/AP supporting the 11ay system.

Alternatively, each of the STAs may correspond to a UE or an AP supporting other systems.

For convenience of description, the STA configured to transmit data and the STA configured to receive data are referred to as a transmitting device 100 and a receiving device 150, respectively.

The transmitting device 100 includes a processor 110, a memory 120, and a transceiver 130 and the receiving device 150 can include a processor 160, a memory 170, and a transceiver 180. The transceiver 130/180 transmits/receives a radio signal and can be implemented in physical layer such as IEEE 802.11/3GPP. The processor 110/160 is executed in physical layer and/or MAC layer and is connected with the transceiver 130/180.

The processors 110 and 160 and/or the transceivers 130 and 180 may include application specific integrated circuits (ASICs), other chipsets, logic circuits, and/or data processors. The memories 120 and 170 may include a read-only memory (ROM), a random access memory (RAM), a flash memory, a memory card, a storage medium and/or other storage units. When an embodiment is executed by software, the method described above may be executed as a module (e.g., a process, a function) that performs the functions described above. The module may be stored in the memory 120,170 and executed by the processor 110,160. The memory 120, 170 may be located inside or outside the processor 110, 160 and may be connected to the processor 110, 160 by a well-known means.

The detailed description of preferred embodiments of the disclosure set forth above is provided to enable those skilled in the art to implement and practice the disclosure. Although the present disclosure has been fully described by way of example with reference to the accompanying drawings, it is to be understood that various modifications and changes may be made in the disclosure without departing from the scope and spirit of the disclosure. Accordingly, the present disclosure is not intended to be limited to the embodiments disclosed herein but is to be accorded the widest scope consistent with the principles and novel features disclosed herein.

INDUSTRIAL APPLICABILITY

The present disclosure is described under the assumption that the disclosure is applied to the IEEE 802.11 based wireless LAN system, but the present disclosure is not limited thereto. That is, the present disclosure is equally applicable to various wireless systems capable of transmitting data based on channel bonding.

The invention claimed is:

1. A method of transmitting, by a first station (STA), data to a second STA in a wireless local area network (WLAN) system, the method comprising:
   receiving allocation information on a secondary channel of the WLAN system and information on the secondary channel from an access point (AP);
   performing a channel sensing (CS) mechanism based on an interframe space (IFS) determined based on the information on the secondary channel within an allocation period on the secondary channel, wherein the allocation period is indicated based on the allocation information; and
   transmitting the data to the second STA during the allocation period from a time when it is determined based on the performed CS mechanism that the secondary channel is an idle state,
   wherein the allocation information on the secondary channel and the information on the secondary channel are received on a primary channel of the WLAN system.

2. The method of claim 1, wherein the allocation information on the secondary channel and the information on the secondary channel are transmitted within a beacon header interval (BHI) or a data transmission interval (DTI) on the primary channel.

3. The method of claim 1, wherein the transmitting, by the first STA, the data to the second STA comprises:
   transmitting, by the first STA, the data to the second STA after a lapse of a predetermined length of a backoff time from the time when it is determined by the performed CS mechanism that the secondary channel is in the idle state, and
   wherein the predetermined length of the backoff time is determined based on the information on the secondary channel.

4. The method of claim 3, wherein the information on the secondary channel includes information on whether the secondary channel is busy during the allocation period indicated based on the allocation information.

5. The method of claim 4, wherein the IFS used in the CS mechanism and the predetermined length of the backoff time are configured differently depending on the information on whether the secondary channel is busy.

6. The method of claim 5, wherein based on the information on the secondary channel indicating that the secondary channel is busy during the allocation period indicated based on the allocation information, the IFS used in the CS mechanism is set to an arbitration IFS (AIFS) per category for the data.

7. The method of claim 5, wherein based on the information on the secondary channel indicating that the secondary channel is not busy during the allocation period indicated based on the allocation information, the IFS used in the CS mechanism is set to a distributed coordination function IFS (DIFS).

8. The method of claim 5, wherein the predetermined length of the backoff time is reduced based on the information on the secondary channel indicating that the secondary channel is not busy during the allocation period indicated based on the allocation information, compared to the information on the secondary channel indicating that the secondary channel is busy during the allocation period indicated based on the allocation information.

9. The method of claim 1, wherein the CS mechanism includes a physical CS mechanism based on the IFS determined based on the information on the secondary channel and a virtual CS mechanism based on a network allocation vector (NAV) timer having a predetermined size.

10. A method of receiving, by a first station (STA), data from a second STA in a wireless local area network (WLAN) system, the method comprising:
    receiving allocation information on a secondary channel of the WLAN system and information on the secondary channel from an access point (AP);
    performing a channel sensing (CS) mechanism based on an interframe space (IFS) determined based on the information on the secondary channel within an allocation period on the secondary channel, wherein the allocation period is indicated based on the allocation information; and
    receiving the data from the second STA during the allocation period from a time when it is determined based on the performed CS mechanism that the secondary channel is an idle state,
    wherein the allocation information on the secondary channel and the information on the secondary channel are received on a primary channel of the WLAN system.

11. A station (STA) device for transmitting data in a wireless local area network (WLAN) system, the STA device comprising:
    a transceiver configured to exchange signals with one or more other STA devices with at least one radio frequency (RF) chain; and
    a processor connected to the transceiver and configured to process the signals exchanged with the one or more other STA devices,
    wherein the processor is configured to:
    receive allocation information on a secondary channel of the WLAN system and information on the secondary channel from an access point (AP);
    perform a channel sensing (CS) mechanism based on an interframe space (IFS) determined based on the information on the secondary channel within an allocation period on the secondary channel, wherein the allocation period is indicated based on the allocation information; and
    transmit the data to a second STA during the allocation period from a time when it is determined based on the performed CS mechanism that the secondary channel is an idle state,
    wherein the allocation information on the secondary channel and the information on the secondary channel are received on a primary channel of the WLAN system.

12. A station (STA) device for receiving data in a wireless local area network (WLAN) system, the STA device comprising:
    a transceiver configured to exchange signals with one or more other STA devices with at least one radio frequency (RF) chain; and a processor connected to the transceiver and configured to process the signals exchanged with the one or more other STA devices, wherein the processor is configured to:

receive allocation information on a secondary channel of the WLAN system and information on the secondary channel from an access point (AP);

perform a channel sensing (CS) mechanism based on an interframe space (IFS) determined based on the information on the secondary channel within an allocation period on the secondary channel, wherein the allocation period is indicated based on the allocation information; and receive the data from a second STA during the allocation period from a time when it is determined based on the performed CS mechanism that the secondary channel is an idle state, wherein the allocation information on the secondary channel and the information on the secondary channel are received on a primary channel of the WLAN system.

* * * * *